United States Patent [19]

Schiffmann et al.

[11] 4,388,335

[45] Jun. 14, 1983

[54] MICROWAVE BAKING WITH METAL PANS

[75] Inventors: Robert F. Schiffmann, New York; Alfred H. Mirman, Pomona; Richard J. Grillo, Peekskill; Robert W. Batey, Port Chester, all of N.Y.

[73] Assignee: International Telephone and Telegraph Corporation, New York, N.Y.

[21] Appl. No.: 233,755

[22] Filed: Feb. 12, 1981

Related U.S. Application Data

[63] Continuation-in-part of Ser. No. 50,397, Jun. 20, 1979, abandoned, which is a continuation of Ser. No. 700,945, Jun. 29, 1976, abandoned.

[51] Int. Cl.$^3$ ............................................. A21D 8/06
[52] U.S. Cl. .................................... 426/243; 426/241
[58] Field of Search ............... 426/241, 242, 243, 244, 426/502, 505, 523, 391; 219/10.55 A, 10.55 E, 10.55 M

[56] References Cited

U.S. PATENT DOCUMENTS 3,556,817 1/1971 Jippson ................................. 426/241
3,854,023 12/1974 Levinson ....................... 219/10.55 E
4,271,203 6/1981 Schiffmann et al. ................ 426/243

OTHER PUBLICATIONS

Levinson, M.; "Aluminum, The Wonder Metal of Microwave Cooking".
Pyler, "Baking Science and Technology", Siebel Publ. Co., Chicago, 1975, vol. 2, pp. 671-680, 764-766, 1160.
DeCareau et al., Potential Applications of Microwave to the Baking Industry, Journal of Microwave Power (3) 3, 1968, pp. 152 $\propto$ 157.

*Primary Examiner*—Joseph M. Golian
*Attorney, Agent, or Firm*—John T. O'Halloran; Robert P. Seitter

[57] ABSTRACT

A method of baking bread in metal pans using microwave energy is described. Overall baking time is reduced by a method of combining conventional and microwave baking. In addition, significant reduction in bake time associated with bread was obtained by employing significantly lower levels of microwave energy and metal pans in a simultaneous microwave and conventional oven heat bake process utilizing conventional bake pans. Reduced bakeout and more uniform baking is achieved if microwave energy is applied at 915 MHz and 2450 MHz simultaneously.

9 Claims, No Drawings

MICROWAVE BAKING WITH METAL PANS

CROSS-REFERENCE TO RELATED APPLICATIONS

This is a continuation-in-part application of application Ser. No. 050,397, filed June 20, 1979, (now abandoned) which was a continuation application of application Ser. No. 700,943, filed June 29, 1976 ( now abandoned).

BACKGROUND OF THE INVENTION

The baking of bread, as in many other cases involving convective/conductive heat transfer, is very wasteful of heat energy. In order to bake the bread, it is necessary to first heat the walls of the oven and the air within the oven so that this heat energy may be transferred to the surface of the bread and then slowly carried to the interior via conductive heat transfer. The process is largely limited by the rate at which heat can be conducted from the surface of the bread to the interior. While the process can be speeded up somewhat in a conventional oven through the use of higher ambient temperatures, this is rapidly limited by the temperature at which the surface begins to brown excessively and bakeout becomes too high, as the major negative effects. The result of this is that white bread is conventionally baked for 17 to 23 minutes at 400° F. to 415° F.

Early experiments in baking bread involved the serial application of microwaves and conventional heat, i.e., first applying microwaves to obtain the oven spring and setting the structure and then finish baking with conventional heat to obtain the much needed crust color. While some degree of success was seen, particularly the 915 MHz frequency, the finished loaves left much to be desired since they tended to collapse, had poor rubbery interior structures and very rough unusual crust characteristics. The initial work was done using "Pyrex" and "Corning Ware" type baking dishes, however, there was excessive collapse due to poor sidewall formation. A significant improvement was made using paperboard containers, however, according to the invention a quantum jump in improvement of product quality began with the use of metal baking pans. This is contrary to all accepted practice in microwave processing. Two publications: K. Lorenz et al, "Baking With Microwave Energy", *Food Technology*, December, 1973; and T. H. Collins, "Exploring the Baking of Bread with Microwaves", *FMBRA Bulletin* (3), P. 175, 1970; both describe the use of metal baking pans for bread baking in a microwave field as an impossibility since the microwaves will only penetrate the dough through the top and not bake evenly.

SUMMARY OF THE INVENTION

Only after the novel process development of simultaneous baking with microwave energy with metal pans and conventional heat was product success achieved. The high temperature within the oven does bake the sides, bottom and top crust of the loaves leaving the microwave energy to concentrate more fully upon setting the center of the loaves through a selective application of low level microwave power at slightly higher oven temperature. The overall effect of this discovery has been to shorten the baking time which results in an oven capacity increase in commercial production. The final loaves baked by this novel procedure are well shaped and show good grain, crust and sidewall formation with no collapse.

It is an object of the invention to shorten baking time by microwave baking with metal baking pans.

It is another object of the invention to combine microwave baking of bread in metal pans and conventional oven heat to shorten baking time, increase standard oven capacity and to reduce substantially energy costs while increasing productivity in less floor space.

According to the invention, the baking of bread through the simultaneous application of microwaves and hot air has shown that bread can be baked successfully by this technique. Baking can be done in as little as 6 minutes, a ⅔ reduction in baking time and increases production by 200%; if the baking process of this invention is adjusted to 10 minutes, there is a ½ reduction in baking time, with an increase of some 80% in production capacity. Preferably, the baking process of this invention is completed in about 12 minutes, which is about a ⅓ reduction in baking time and increases production capacity by some 50%. The bread is baked in standard metal baking pans. The method of this invention substantially improves the control over the bread during bakeout.

DESCRIPTION OF THE PREFERRED EMBODIMENTS

A successful process to achieve microwave baking with metal pans requires critically controlling the microwave power input, high temperature range and baking time. Both 915 MHz and 2450 MHz frequencies and combinations thereof can be used to achieve a successful product.

The present invention will be more readily understood from a consideration of the following specific examples which are given for the purpose of illustration and not to be considered as limiting the scope of the invention.

EXAMPLE I

A high temperature microwave oven, a Hirst "Microaire" oven, was used at the 2450 MHz frequency. A typical standard white bread formulation was used as follows:

| Ingredients | Approximate Percent by Weight |
| --- | --- |
| Sponge: | |
| Flour | 34.7 |
| Yeast | 1.60 |
| Yeast Food | .25 |
| Water | 21.25 |
| Dough: | |
| Flour | 18.7 |
| Salt | 1.20 |
| Sucrose | 2.10 |
| Dextrose | 2.70 |
| Lard | 1.60 |
| Water | 13.9 |
| Nonfat Dry Milk | 2.00 |

PROCEDURE

The sponge ingredients are combined and mixed in a jacketed three pin bowl and mixed for 30 seconds at low (first) speed on C100 Hobart Mixer and four minutes at medium (second) speed on the mixer. The sponge is allowed to ferment for about four hours then combined with the dough ingredients and mixed 30 seconds at low (first) speed on C100 Hobart Mixer and eight minutes at medium (second) speed on the mixer. The mixed dough is allowed to relax for about 10 minutes then weighed (16 oz.) and shaped into individual loaves. The one pound dough pieces are placed in conventional metal bread pans, typically 4"×4"×8", and allowed to proof for approximately one hour. The proofed loaves were baked using the "Microaire" oven while varying the microwave power output baking temperature and time in the oven.

RESULTS

The final loaves which were baked in metal pans under the following conditions:

| power output of the magnetron | 75 to 100 watts per lb. loaf |
|---|---|
| calorimetrically measured baking temperature | 415° F. to 425° F. |
| baking time | 11 to 13 minutes | were well shaped and showed good grain, crust and sidewall formation with no collapse. The overall effect of this novel procedure has been to shorten the baking time, and at the preferred time of 12 minutes, the desired bakeout and crust color was achieved. This is a reduction of about ⅓ in the time required for normal baking and enables a substantial increase in production with existing facilities.

Converting the baking time and watts per lb. loaf into microwave flux density, utilizing the above data, the microwave flux density is 13.8 to 21.7 watt hours per pound.

For a better understanding of the general nature of the process of this invention, it should be understood that microwave baking in metal pans has been generally held to be, if not impossible, certainly impractical. This is for two reasons: First, metals reflect microwaves and the large mass of metal flowing through an oven presents microwave problems which could seriously damage the magnetrons. Secondly, the reflection also restricts the microwaves from entering the dough mass proper and thus inhibits their baking effect. The first problem was not considered serious in the work which is reflected in the working example above because a batch oven process was utilized. To the extent there was some reflection of the microwaves back to the magnetrons, it has been observed to be fairly small, certainly within safe limits, and no problems have occurred. It should be understood that both of these problems may need to be taken into account in a large size commercial system, but should be capable of being overcome by proper engineering.

The second problem is of greater importance to the work which is represented here. Work has gone on in several labs, particularly in the British Flour Milling and Baking Research Association, to utilize microwaves to bake bread. The work which has been done for some 7 or 8 years at least, has been unsuccessful primarily because they have not determined how to solve the baking pan problem and accordingly, they have not used metal pans.

The key to the success of the process of this invention where others have failed is the utilization of low levels of microwave power whose primary function is not to bake out the bread, in other words, to remove water, but rather to set the structure by accelerating starch gelatinization which results in a much less costly process in terms of total energy requirements.

Basically, the process of this invention employs the use of conventional heating means of an oven to heat the pan, build sidewalls and the crust to cause most of the oven spring and most of the bakeout. Meanwhile, the microwaves are added to set the interior and aid in transporting some of the free water toward the surface of the dough. Experiments conducted to compare the effects of baking time, baking temperature and microwave power input indicated that baking time and temperature played the primary function in baking out the dough, i.e., to cause water evaporation. This follows, since almost all of the water evaporated from the dough comes from the crust, an area only a fraction of an inch in depth.

It should also be appreciated that the microwave fields drop to zero at metal walls and within a quarter wave distance out from the wall (a distance of about 3 cm in air but considerably less in dough). Hence, the microwaves have their effect internally and for this reason, led to the work to establish that it is possible to bake bread successfully using conventional heat and microwave energy to bake dough in metal pans.

It should also be appreciated that the use of low levels of microwave energy is particularly advantageous for several reasons. First, it is move economical inasmuch as it does not require as large a microwave power output so that the equipment and operating costs are lower. Secondly, its low energy levels make it easier to control the baking of the bread, since if the power input goes too high, it causes excessive bakeout unless the bake time is cut back sharply, in which case the conventional heat does not have the proper time to crust the bread, form the sidewalls and the outer structure with the result that the bread may collapse and the center be excessively dry. Further, the center structure will be wild, it will not be evenly celled but will contain large bubbles or holes. The third advantage in using low levels of microwave energy is that it reduces the possibility of damaging the magnetron due to the excessive reflected, unutilized microwave power.

As pointed out above, one of the phenomena that occurs in connection with microwaves associated with metal boundaries is that the fields drop to zero at a distance of one quarter of the wavelength from the metal surface. As indicated, this represents a distance of approximately 3 cm at 2450 MHz and also is above 10 cm at 915 MHz, both distances being considerably shorter in bread dough. One possible explanation for the efficacy of the use of low level microwave energy found successful in connection with the process of this invention may be that the interior reflective walls of the baking pans act as if they were "mirrors" to focus the microwave energy at or near the central portions of the dough. This would perform a beneficial effect in constraining the microwave energy where it is most needed in the heat transfer sense. In other words, near the center of the dough where conventional conductive heat cannot reach until the last part of the heat is transferred. This "focussing effect" is not unknown to those of ordinary skill in the art who design microwave ovens so that the food supporting shelf is raised a multiple of the half-wave distance from the metal floor, and who further advises the cook to place the food in the center of the shelf away from the walls. However, no one prior to this invention has applied this knowledge to baking bread in a metal baking pan structure.

EXAMPLE II

The ingredients and procedure would be the same as for Example I up to the end of proofing. Instead the proofed loaves were baked in the metal pans which were placed three at a time on the glass support shelf in the "Microaire" microwave oven. The baking conditions were 440° F. air temperature, 150 watts output microwave power (this having been measured calorimetrically prior to the test) for a total baking time of 12 minutes. This corresponds to a microwave flux density of 10 watt hours per pound of bread. The finished loaves were allowed to cool for 30 minutes, sliced and examined. They exhibited good grain, crust color, and overall appearance, and had excellent eating quality. Bakeout measurement out of the oven yielded 10.7% bake out and a loaf height of 5 inches which was comparable to the control.

EXAMPLE III

The ingredients and procedure are the same as Example I up to the end of the proofing step. The proofed loaves were baked in metal pans which were placed three at a time on the glass support shelf in the "Microaire" microwave oven. The baking temperature was 440° F. and 360 watts output microwave power was used. The microwaves were employed for only the first six minutes of the total 12 minutes baking time. This would correspond to a microwave flux density of 12 watt hours per pound of bread. The finished loaves were allowed to cool for 30 minutes, sliced and examined. They exhibited good grain, crust color and overall appearance, and had excellent eating quality. Both bakeout and loaf height were comparable to the control.

EXAMPLE IV

The ingredients and procedure as before are the same as in Example I up through the end of the proofing step. The proofed loaves were baked in metal pans which were placed three at a time on the glass support shelf in the "Microaire" microwave oven. The baking temperature was 440° F. and 360 watts output microwave power was used. The microwaves were employed for the last 3 or the last 6 minutes of the total 12 minutes baking time. This would correspond to microwave flux densities of 6 and 12 watt hours per pound of bread, respectively. The finished loaves were allowed to cool for 30 minutes, sliced and examined. They exhibited good grain, crust color, and overall appearance, and had excellent eating quality. The bakeout of the 3 minute sample was equivalent to that of the control while that of the 6 minutes' sample was significantly higher. The loaf height on all samples was equivalent to the control.

In summary, the work represented by the above examples, a baking time of 10 to 14 minutes and preferably 12 minutes is achieved. The oven temperature is varied between 400° F. and 450° F. and preferably between 425° to 440° F. A microwave power flux density is variable between 6 and 20 watt hours per pound loaf and the microwave energy is supplied for from between 3 to 12 minutes and preferably 6 to 9 minutes as illustrated in Example III, or 3 to 6 minutes as illustrated in Example IV.

The baking of bread in metal pans at 915 MHz and 2450 MHz, each frequency being used separately, was compared to baking using those frequencies simultaneously. In order to accomplish this, a Vulcan Electric Reconstitution Oven, which is a high-velocity, forced-air oven, was modified to accept microwave energy. Modifications were made to the door structure and frame in order to prevent microwave leakage; to the internal baffles, which directed hot air, in order to prevent excessive coupling of microwaves into these structures; and to the outer shell to accept waveguide couplings from two microwave generators: a two and one-half (2.5) kilowatt Cober Model S2.5 operating at 2450 MHz; and a two (2.0) kilowatt Cober Model L2 operating at 915 MHz. The power output at each frequency was variable over its power output range. In the course of initial experiments with this unit, the effect of baking time, the microwave power and frequency, upon bakeout, that is, the amount of water evaporated or "baked out" of the bread, was studied. In these tests, five sets of three one pound loaves each were baked as follows:

| Bake Time | Equivalent % Bakeout | Added Microwave Energy |
|---|---|---|
| 6 minutes | 13.11 | 1700 watts 2450 MHz |
| 6 minutes | 14.00 | 1900 watts 915 MHz |
| 6 minutes | 12.28 | 1000 watts 2450 MHz + 900 watts 915 MHz |
| 8 minutes | 12.57 | 740 watts 915 MHz |
| 8 minutes | 11.30 | 450 watts 915 MHz + 480 watts 2450 MHz |

All loaves were baked at 400° F. and microwaves were added for the total baking time. The actual bakeout percentage for the first set of three loaves was 11.73%, but was corrected above to the equivalent bakeout percentage of 13.11% for 1900 watts of added microwave energy (i.e., 11.73×1900/1700=13.11). Similarly, the actual bakeout percentage for the fourth set of loaves was 10.00%, but is corrected above to the equivalent bakeout percentage of 12.57% for 930 watts.

The above table demonstrates that a mixture of the two microwave frequencies, 915 MHz and 2450 MHz, gives an unusual and unexpected result: a lower bakeout than is achieved by either frequency alone for a comparable total power.

The advantage of using microwaves with combinations of both 2450 MHz and 915 MHz simultaneously over using either frequency alone has a theoretical basis.

The wavelength in air of these two frequencies are 12.2 cm and 33.0 cm, respectively, and hence, the effective depth of penetration differs for each. Although dielectric data is not available on bread dough, some assumptions may be made which indicate that the half-power depth (that is, the depth at which one-half of the energy is dissipated) is on the order of 2 cm for 2450 MHz and 5.4 cm for 915 MHz by using the equation:

$$D_{\frac{1}{2}} = \frac{0.269\lambda_o}{\epsilon' \cdot \tan\delta},$$

where
$D_{\frac{1}{2}}$ = Half-power depth
$\lambda_o$ = wavelength in air
$\epsilon'$ = dielectric strength = 30
$\tan\delta$ = loss tangent = 0.3.

This indicates that the higher frequency (2450 MHz) concentrates its energy nearer to the outer surface of the bread loaf, whose cross-section is typically 10 cm × 10 cm approximately for a one-pound loaf. On the other hand, the lower frequency (915 MHz) has a greater depth of penetration and is able to penetrate deep into the bread dough; however, its energy density is such that the outer layers of bread receive less energy than they would from 2450 MHz alone. The combination of the two frequencies thus causes a more uniform baking of the loaf and thus better quality bread, and when judiciously applied does so without baking out as much moisture as with either frequency alone.

The utilization of simultaneous frequencies in the process of the invention is demonstrated in the following examples:

EXAMPLE V

This and the following example use A&P "Bridgeford" dough in the 16 ounce size. The Bridgeford dough is a typical white bread dough, comparable to that described in detail in Example I above. It was conventionally prepared and proofed for approximately one hour, until it reached a maximum height of 1½ inches above the top of the pan, before baking as follows in conventional metal baking pans.

Three loaves, averaging 1.1 pounds each, were baked in the metal pans in the modified Vulcan Electric Reconstitution Oven for six minutes at a 400° F. setting. The actual temperature measured by a thermocouple was between 380° F. to 420° F. During the baking step and for the entire six minutes thereof, added microwave energy was applied at 915 MHz and 2450 MHz simultaneously and the flux densities in the oven were measured at 27 watt-hours per pound of bread for 915 MHz and 30.3 watt-hours per pound of bread for 2450 MHz. It is estimated that the bread was actually subjected to flux densities of approximately 21 watt-hrs./lb. of bread for 915 MHz and 23 watt-hrs./lb. of bread for 2450 MHz. The difference between the flux densities in the oven and the respective flux densities in the bread is the result of losses inherent in the transmission of microwave energy.

Bakeout was measured at 12.3%. The loaves were allowed to cool for 60 minutes, sliced and examined. They exhibited good grain, crust color and overall appearance and had excellent eating quality.

EXAMPLE VI

The procedure is the same up to the baking step. The baking time in the Vulcan oven of the three loaves, which averaged 1.04 pounds each, was eight minutes at the same temperature. The microwave energy measured in the oven at 915 MHz and 2450 MHz applied simultaneously during the entire baking time was 14.9 watt-hrs./lb. for 915 MHz and 20.5 watt-hrs./lb. for 2450 MHz. It is estimated that the actual flux densities in the bread were approximately 8.4 watt-hours./lb. for 915 MHz and 14 watt-hrs./lb. for 2450 MHz.

Bakeout was measured at 11%. The finished loaves were examined as above and found to be equivalent to conventionally baked bread.

From the above and other tests using two frequencies simultaneously, it is believed that the ratio of the output power at each frequency can be varied over a wide spectrum providing, however, that the total microwave power flux density in the bread is within certain limits as discussed below. Further, it is believed that the mixed frequencies could be applied for only part of the total baking period, i.e., from 3 to 14 minutes of the baking time. The baking temperature can be between 380° F. and 450° F., preferably between 400° F. and 440° F. when using mixed microwave frequencies, and the baking time can be varied between 6 and 14 minutes, with the best results achieved at 8 to 12 minutes. The tests were done with one-pound loaves, but the results are applicable to other size loaves.

It will be noted that the flux densities in Examples V and VI are considerably higher than those in Examples I through IV. The difference is due to the absence in the Vulcan oven used in the dual-frequency experiments of a blower that produced optimum circulation of the hot air in the oven. Therefore, the "Microaire" oven which had such a blower and was used in the single-frequency experiments, was more efficient and performed the thermal portion of the baking process under optimum conditions. It is believed, from the above and other tests, that with optimum performance of the thermal portion of the baking process, that the microwave power flux density in the bread, totaled for both frequencies, can go as low as six watt-hours per pound of bread. A total flux density that low will produce beneficial internal baking within the 14 minute maximum baking time, which, if exceeded, will cause excessive browning of the exterior of the bread. On the other hand, if the total microwave power flux density is too high, internal baking will proceed too rapidly and can produce a ragged interior structure or excessive expansion followed by severe collapse upon removal from the oven. With little or no circulation of the hot air, it is believed that the total flux density cannot exceed about 49 watt-hours per pound of bread without causing those problems. However, under optimum conditions for the thermal portion of the baking process, the total power flux density in the bread must not exceed 22 watt-hours per pound of bread, and that flux density will provide adequate internal baking if applied for at least three minutes.

For example, bread in loaves weighing approximately one pound may be baked according to the present invention, at optimum application of the thermal portion of the baking process, at 440° F. for 8 minutes with microwave energy applied at 10 watt-hrs./lb. of bread at each frequency, 915 MHz and 2450 MHz (a total of 20 watt-hrs./lb.), for the total baking time. As another example, again at optimum application of the thermal portion of the baking process, bread in one-pound (approximately) loaves can be baked at 425° F. for 14 minutes with microwave energy applied at 5 watt-hrs./lb. of bread at each frequency (a total of 10 watt/hrs./lb.), for the total baking time. As a final example, again with optimum application of the thermal portion of the baking process, bread in loaves weighing approximately two pounds can be baked at 450° F. for 12 minutes. Microwave energy is added at 10 watt/hrs./lb. of bread at 915 MHz and 5 watt/hrs./lb. of bread at 2450 MHz for the total baking time. The higher flux density at the lower frequency applies more microwave energy deeper in the loaves because of the larger loaf size.

It will be appreciated by those of skill in the art that the method of this invention has been described in connection with the specific examples illustrating the experimental work completed. Within the general principles which are the subject of this invention, it will be appreciated that the variables may be altered for purposes of scaling the experiments into commercial bakeries and that some considerable latitude in operating parameters may be employed without departing from the scope of the appended claims.

We claim:

1. A method for decreasing the time required for baking bread comprising the steps of:

providing an individual loaf of bread dough weighing at least approximately one pound in a metal baking pan;

proofing said loaf in said baking pan;

baking said proofed loaf in said baking pan in a hot air oven at a temperature of 380° to 450° F. for a total baking time of 6 to 14 minutes; and applying to said proofed loaf in said baking pan microwave energy at frequencies of both 915 MHz and 2450 MHz simultaneously at a predetermined total power flux density in said loaf between 6 and 22 watt-hours per pound of bread divided between said frequencies for a minimum of three minutes during said baking step.

2. The method recited in claim 1, wherein said hot air is applied under optimum conditions.

3. The method recited in claim 2, wherein said total power flux density is divided equally between said frequencies.

4. The method recited in claim 3, wherein a plurality of said loaves are provided, each in an individual metal baking pan and each weighing approximately one pound.

5. The method recited in claim 2, wherein said frequency of 915 MHz is applied at a predetermined power flux density higher than the power flux density at which said frequency of 2450 MHz is applied.

6. The method recited in claim 4, wherein said total baking time is eight minutes.

7. The method recited in claim 6, wherein said baking temperature is approximately 440° F. and said microwave energy is applied for the duration of the baking step at a total power flux density in said loaves of 20 watt-hours per pound of bread.

8. The method recited in claim 4, wherein said baking temperature is approximately 425° F., said total baking time is 14 minutes, and said microwave energy is applied for the duration of the baking step at a total power flux density of 10 watt-hours per pound of bread.

9. The method recited in claim 5, wherein a plurality of said loaves are provided, each in an individual metal baking pan and each weighing approximately two pounds, said baking temperature is 450° F., said total baking time is 12 minutes and said microwave energy is applied for the duration of the baking step at a power flux density of 10 watt-hours per pound of bread for said 915 MHz frequency and 5 watt-hours per pound of bread for said 2450 MHz frequency.

* * * * *